United States Patent Office 3,615,126
Patented Oct. 26, 1971

3,615,126
PHOTOGRAPHIC OBJECTIVE WITH A REAR STOP
Tadashi Kojima, Tokyo, Japan, assignor to Konishiroku Photo Industry Co., Ltd., Chuo-ku, Tokyo, Japan
Filed Nov. 24, 1969, Ser. No. 879,415
Claims priority, application Japan, Nov. 27, 1968, 43/86,351
Int. Cl. G02b 9/20
U.S. Cl. 350—227         4 Claims

ABSTRACT OF THE DISCLOSURE

A photographic objective with a rear stop comprises three lens groups generally arranged in Tessar type, but the axial spacing between the lens groups is minimized while the thickness of the first and third lens groups is made relatively large to reduce the back focal length of the objective without increasing, if not eliminating, the vignetting at the rear stop for a ray having a half field angle approaching 30° and with simultaneously providing a favorable correction of various higher order aberrations.

---

Figure 1:
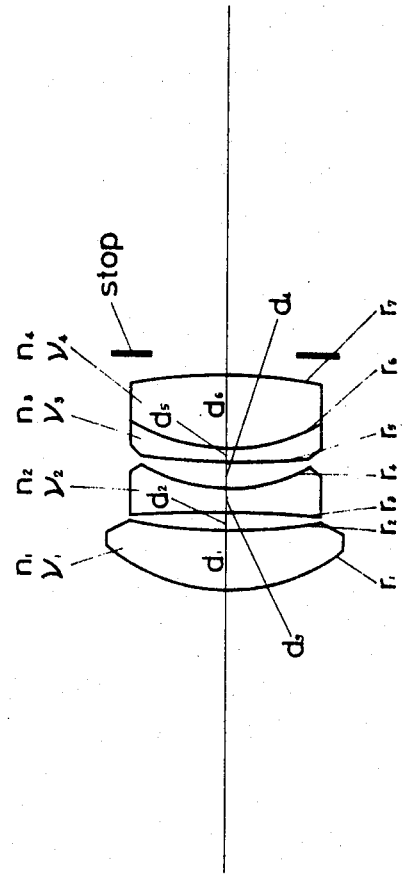

The invention relates to an improvement in photographic objectives adapted for use in compact photographic cameras, and more particularly to such objective with a rear stop.

In compact cameras of popular type in which automatic control of exposure is provided, it is convenient to position a stop behind an objective for the convenience in incorporating a shutter mechanism into the camera body. A photographic objective of Tessar type with a rear stop has been proposed by the present applicant previously (refer Japanese Registered Utility Model No. 849,127), for an aperture ratio between F2.8 and F3.5 and a half field angle between 25° and 30°. This comprises three lens groups spaced apart by air gaps, the first group being a meniscus converging lens having a convex surface towards an object being photographed, the second group being a double concave diverging lens and the third group being a double convex cemented converging lens having its cemented surface convex towards the object. The axial thickness of and separation between the lens members are minimized in order to avoid the vignetting effect for a ray having a half field angle in excess of 25°.

The invention aims to improve the above mentioned photographic objective in certain respects. First, it is desirable for a compact camera structure to have the rear stop and rear shutter as close to the film surface as possible. To this end, it is necessary to minimize the back focal length of the optical system, having a minimal spacing required for the film loading. Specifically, the back focal length should be decreased to a value around $0.75f$, where $f$ denotes the focal length. Secondly, the vignetting effect, in particular such effect caused for a ray having a large field angle, at the minimum aperture of the stop, should be prevented since the reduction of the back focal length is likely to increase the vignetting, so that the resulting objective may provide a sufficient amount of light input to the marginal regions of the film. Thirdly, while the reduction of the back focal length is likely to accompany an increase of aberrations, this should be avoided. Therefore, it is another specific object of the invention to provide an objective of high performance, in particular, with minimized higher order spherical aberration and curvature in the sagittal plane as well as comatic flare.

The above objects are achieved in accordance with the invention by providing a photographic objective with a rear stop positioned in the image side space adjacent the final refractive surface, said objective comprising three lens groups, the first lens group being a meniscus converging lens having a convex surface towards an objective being photographed, the second lens group being a double concave diverging lens and the third lens group being a double convex cemented converging lens having its cemented surace convex directed towards the object, all of the lens groups being mutually spaced by air gaps of an extremely small length, wherein denoting the focal length of the whole system by $f$, axial separations between successive refractive surfaces by $d_1, d_2 \ldots d_6$, radius of curvature of succesive refractive surfaces by $r_1, r_2 \ldots r_7$, and refractive indices with respect to $d$-line of respective glass members from which lenses are made by $n_1, n_2 \ldots n_4$, respectively, the constructional data is defined as follows:

$$0.075f < d_1 < 0.125f$$
$$0.020f < d_2 < 0.045f$$
$$0.020f < d_3 < 0.050f$$
$$0.025f < d_4 < 0.060f$$
$$0.14f < d_2 + d_5 + d_6 < 0.22f$$
$$0.29f < r_1 < 0.35f$$
$$-3.3f < r_3 < -1.8f$$
$$0.26f < r_4 < 0.32f$$
$$0.20f < r_6 < 0.45f$$
$$1.70 < n_1 < 1.85$$
$$1.70 < n_4 < 1.85$$
$$0.04 < n_4 - n_3 < 0.19$$

The reason for choosing the above requirements will be described hereinafter. The first four inequalities for $d_1$ to $d_4$ are the basic requirements to avoid the vignetting at the rear stop when the back focal length is reduced. As mentioned previously, in the objective of the registered utility model referred to above, the axial thickness of and axial separation between the lens members have been minimized to avoid the vignetting at the rear stop. However, as compared with this arrangement, the objective according to the invention is characterized in that the separation between adjacent lens members is reduced to the possible extreme limit and the lens thickness is increased, thereby providing unique axial separations between refractive surfaces.

This choice is made because the increase of the air spacing between the first and second lens groups, which would most effectively contribute to the reduction of the back focal length, results in a grave disadvantage in respect of the vignetting at the rear stop. The present invention is based on the finding that an extreme reduction of the air spacing between the first and second lens groups affords sufficient allowance as far as the vignetting is concerned, so that thickness of the first lens group can be increased to provide a substantial reduction of the back focal length. Thus the inequality $0.020f < d_2 < 0.045f$ is essential in order to have an increased height of incidence at the rear stop position for a ray of a large field angle. The lower limit is set for a F-number of 2.8, and the upper limit is set to maintain above effect. When this inequality for $d_2$ is met, it is then necessary to satisfy the inequality $0.075f<d_1<0.125f$ for reducing the back focal length without influencing the vignetting. The vignetting problem arises above the upper limit, and the intended reduction cannot be attained below the lower limit. A slight increase in the thickness of the second lens concurrently with a substantial decrease of the air spacing between the second and third lens groups is effective to further reduce the back focal length. When $d_4$ is chosen to satisfy the relation, $0.025f<d_4<0.060f$, the back focal length will increase slightly, but there will be obtained, at a greater rate, an increase in the height of incidence at the rear stop position of a ray having a large field angle. The lower limit in this inequality is determined by the mechanical possibility to bring the second and third lens groups close to each other, while when the upper limit is exceeded, there will be an appreciable increase of the back focal length. In order to compensate for the increase of the back focal length that results from imposing the above inequality upon $d_4$, the thickness of the second lens is increased slightly and $d_3$ is chosen to satisfy the inequality: $0.020f<d_3<0.050f$. This results in an increased height of incidence at the rear stop position of a ray having a large field angle, thereby preventing the vignetting at the minimum aperture and serving at the same time to increase the amount of light input to the marginal regions. Below the lower limit, the desired reduction of back focal length is rendered impossible, and when the upper limit is exceeded, the vignetting results. By satisfying the above requirements represented by the four inequalities, the first object of the invention, that is, the reduction of back focal length is satisfactorily achieved.

The resulting construction has extremely reduced air spacing between the three lens groups with the first and third lens groups having an increased axial thickness, so that the construction is much different in configuration from those of known objectives of Tessar type. The increase in thickness of the first lens groups as defined by the inequality $0.075f<d_1<0.125f$ and the minimized spacing between the second and third lens groups as defined by the inequality $0.025f<d_4<0.060f$ serve, in combination, to provide a substantial reduction of the curvature of image field in the sagittal plane.

The requirement $0.020f<d_2<0.045f$ established for avoiding the vignetting at the rear stop is found to induce a substantial amount of comatic flare for the upper portion of a beam emanating from an object, positioned above the optical axis, with a large field angle. This comatic flare is effectively eliminated by having the curvature of the curvature of the third refractive surface as small as possible. The limitation $-3.3f<r_3<-1.8f$ is found to appreciably reduced the flare as well as overcorrected higher order spherical aberration. A greater radius of curvature which exceeds the lower limit defined by the above inequality will render the correction of third order spherical aberration difficult.

The requirement $0.020f<d_2<0.045f$ further results in a substantial amount of coma, by overcorrection, for the lower portion of a beam having a field angle approaching the maximum field angle. This could be effectively corrected by having an increased value of $d_4+d_6$, that is, the thickness of the third lens group, but taking the $d_2$-value into consideration, a favorable correction for coma in the outer marginal region of the image field has been obtained by choosing $0.14f<d_2+d_5+d_6<0.22f$. The limitation $0.14f<d_2+d_5+d_6$ simultaneously serves a reduction of the curvature of image field in the meridional and sagittal planes. However, if the composite thickness is increased above the upper limit, such increase causes a rapidly increasing coma for the lower portion of a beam having intermediate field angles.

Similarly, comatic flare for the lower portion of a beam having intermediate field angles is also caused by the choice $0.075f<d_1<0.125f$ and $0.020f<d_3<0.050f$, which are selected to reduce back focal length by increasing the thickness of the first and third lens groups. In order to eliminate such comatic flare, it is found strongly effective to provide a relatively large curvature for the sixth refractive surface as defined by the inequality $0.20f<r_6<0.45f$ with an associated condition $0.04<n_4-n_3<0.19$ for the cemented surface in the third lens group. When the upper limit for $n_4-n_3$ and the lower limit for $r_6$ are exceeded, the lower portion of a beam incident upon corners of the image field will exhibit a rapid increase of overcorrected coma-like aberration, and also an increase of the curvature of image field in the sagittal plane will result. When the lower limit for $n_4-n_3$ and the upper limit for $r_6$ are exceeded, the elimination of comatic flare at intermediate field angles will not be attained.

While the choice of a large value for $r_1$ as defined by the inequality $0.29f<r_1$ is effective to the reduction of third order spherical aberration and of comatic flare which results from the overcorrection for upper rays, an unlimited increase of $r_1$-value will lead to the undercorrection of the curvature of image field in both meridional and sagittal planes rather rapidly, so that $r_1<0.35f$ must be chosen.

The requirement $0.26f<r_4<0.32f$ compensates for the undercorrection of astigmatism which results from the reduction of $d_2$-value. Higher order undercorrected coma results below the lower limit, while the astigmatism cannot be corrected when the upper limit is exceeded. The requirements $1.70<n_1<1.85$ and $1.70<n_4<1.85$ are imposed for reducing the Petzval's sum and thereby allowing the choice of a relatively large value for $r_1$ and $r_7$. The objective of the kind mentioned herein has a tendency to have an increased value of Petzval's sum, since the reduction of the Petzval's sum achieved by an increased $d_1$-value is offset by the increase of the sum which is attributed to the reduction of $d_2$- and $d_4$-values as well as the increase of $d_5+d_6$. For this reason, it is necessary that both $n_1$ and $n_4$ have a refractive index in excess of 1.70, which explains the lower limits in the above requirements. The upper limits, or $n_1<1.85$ and $n_4<1.85$, are given by available glass members. The choice $1.70<n_1<1.85$ permits $r_1$ to have a relatively large radius of curvature with resulting effects mentioned above. The choice $1.70<n_4<1.85$ permits $r_7$ to have a relatively large value as a result of the fact that third order aberrations of the total system are corrected, thereby contributing to the correction of the higher order curvature of image field in the meridional plane.

By the choice mentioned above, the invention has achieved an objective with rear stop and with half field angle of around 30°, and which has a reduced back focal length and favorably corrected higher order spherical aberration, higher order curvature of image field and comatic flare.

Figure 2:
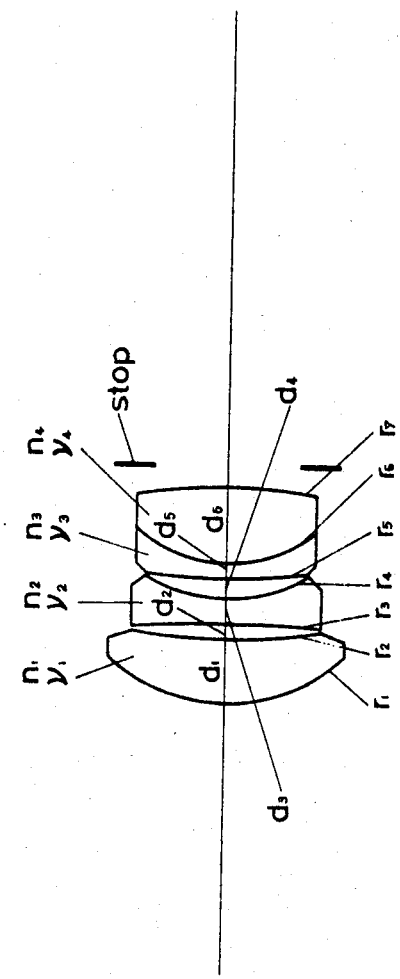
Figure 3:
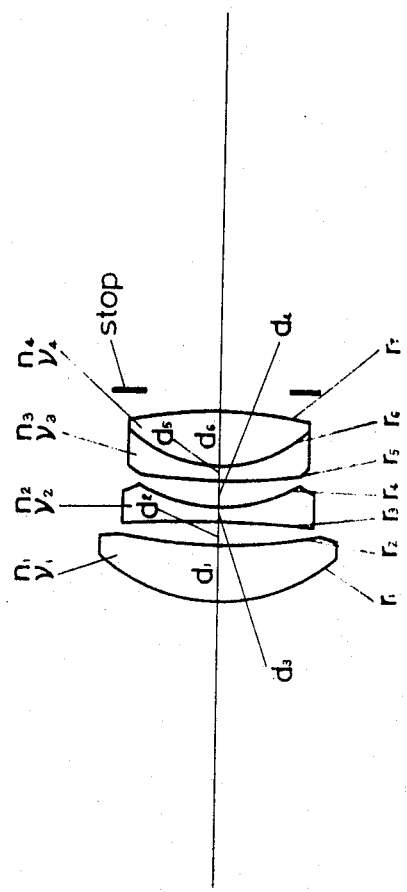
Figure 4:
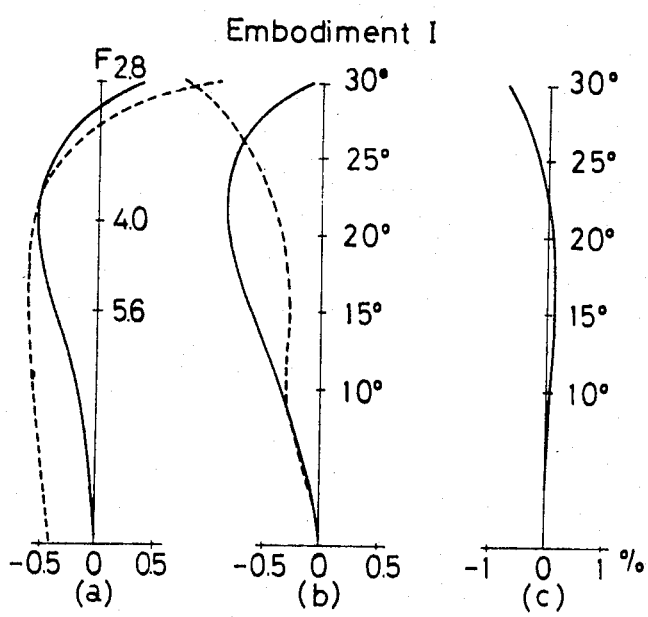
Figure 5:
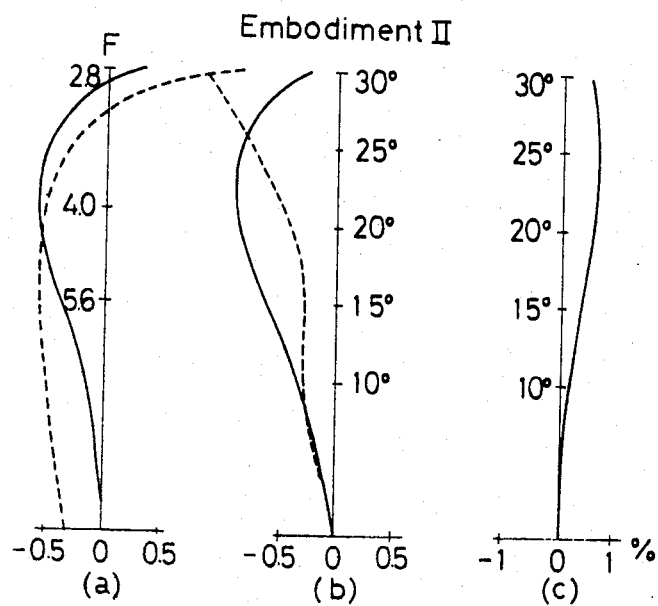
Figure 6:
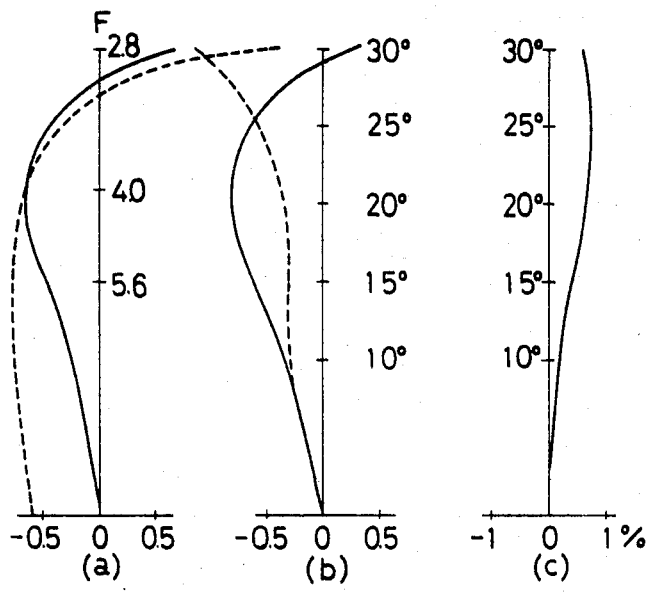
Figure 7:
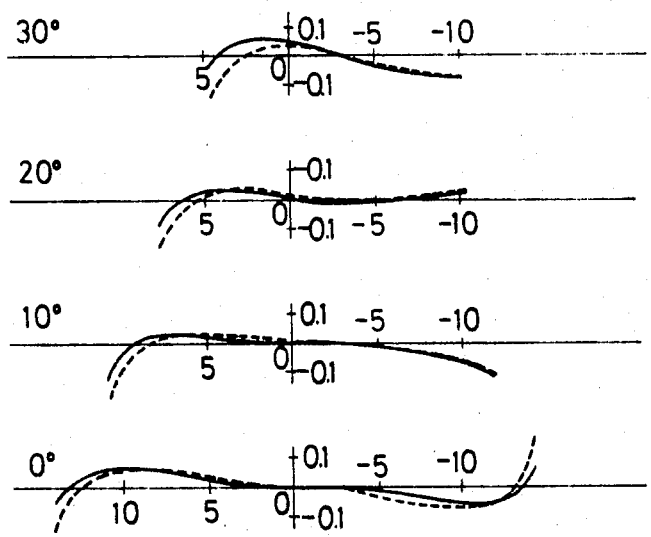
Figure 8:
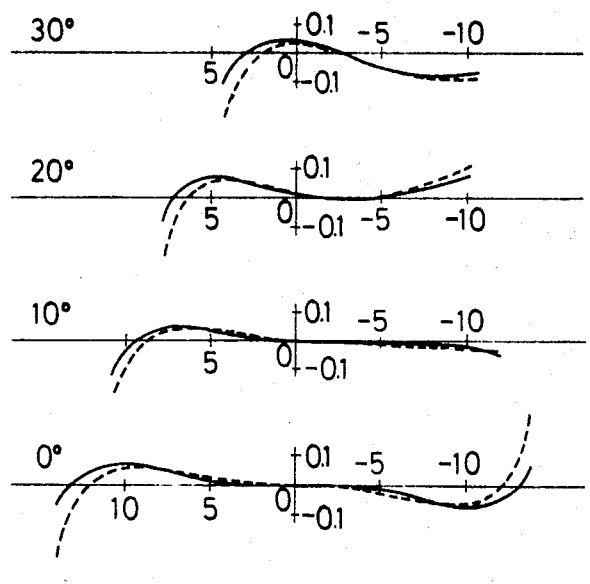
Figure 9:
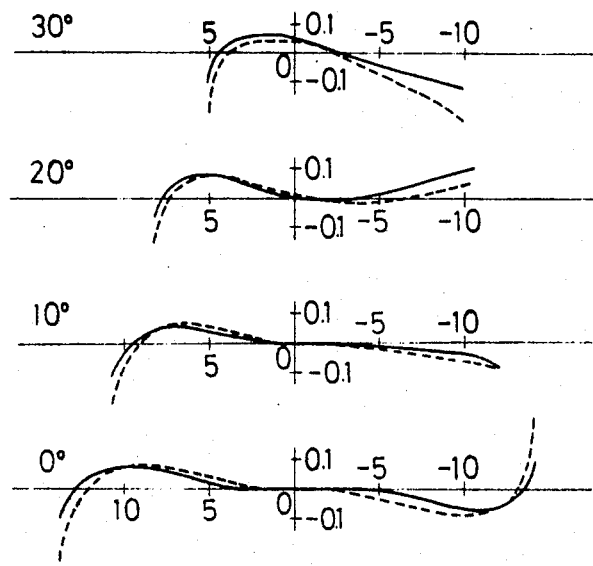

For better understanding of the invention, several embodiments will be described below with reference to the drawings in which, FIG. 1 shows an objective according to a first embodiment of the invention, FIG. 2 shows an objective according to a second embodiment of the invention, FIG. 3 shows an objective according to a third embodiment of the invention, FIGS. 4(a) to 6(a) show sperical aberration of the first to third embodiments shown in FIGS. 1 to 3, respectively, FIGS. 4(b) to 6(b) show astigmatism of the three embodiments, respectively, FIGS. 4(c) to 6(c) show distortion of the three embodiments, respectively, and FIGS. 7 to 9 show coma in the meridional plane of the three embodiments, respectively.

Constructional data for three embodiments of the invention is given in the tables below, where $f_B$ denotes back focal length.

EMBODIMENT I
$f=1.0$  $f_B=0.7658$  F1:2.8

| | | | |
|---|---|---|---|
| $r_1=0.5308$ | | | |
| | $d_1=0.1$ | $n_1=1.80420$ | $\nu_1=46.6$ |
| $r_2=0.9499$ | | | |
| | $d_2=0.027$ | | |
| $r_3=-2.8539$ | | | |
| | $d_3=0.045$ | $n_2=1.75690$ | $\nu_2=31.7$ |
| $r_4=0.3074$ | | | |
| | $d_4=0.042$ | | |
| $r_5=1.2015$ | | | |
| | $d_5=0.025$ | $n_3=1.72825$ | $\nu_3=28.3$ |
| $r_6=0.3208$ | | | |
| | $d_6=0.1$ | $n_4=1.83060$ | $\nu_4=36.5$ |
| $r_7=-0.9269$ | | | |

EMBODIMENT II
$f=1.0$  $f_B=0.7478$  F1:2.8

| | | | |
|---|---|---|---|
| $r_1=0.3174$ | | | |
| | $d_1=0.110$ | $n_1=1.77250$ | $\nu_1=49.6$ |
| $r_2=1.0374$ | | | |
| | $d_2=0.027$ | | |
| $r_3=-2.9605$ | | | |
| | $d_3=0.045$ | $n_2=1.75690$ | $\nu_2=31.7$ |
| $r_4=0.2839$ | | | |
| | $d_4=0.035$ | | |
| $r_5=1.0855$ | | | |
| | $d_5=0.025$ | $n_3=1.75690$ | $\nu_3=31.7$ |
| $r_6=0.2503$ | | | |
| | $d_6=0.135$ | $n_4=1.83060$ | $\nu_4=36.5$ |
| $r_7=-0.9408$ | | | |

EMBODIMENT III
$f=1.0$  $f_B=0.7637$  F1:2.8

| | | | |
|---|---|---|---|
| $r_1=0.3120$ | | | |
| | $d_1=0.100$ | $n_1=1.80420$ | $\nu_1=46.6$ |
| $r_2=0.9474$ | | | |
| | $d_2=0.038$ | | |
| $r_3=-2.400$ | | | |
| | $d_3=0.030$ | $n_2=1.75520$ | $\nu_2=27.5$ |
| $r_4=0.2788$ | | | |
| | $d_4=0.040$ | | |
| $r_5=1.1000$ | | | |
| | $d_5=0.025$ | $n_3=1.69895$ | $\nu_3=30.1$ |
| $r_6=0.2300$ | | | |
| | $d_6=0.100$ | $n_4=1.75690$ | $\nu_4=31.7$ |
| $r_7=-0.7555$ | | | |

In the tables above, $r_1$ to $r_7$ denote the radius of curvature of the respective refractive surfaces, respectively, as numbered from the front of the objective facing an object being photographed, $d_1$ to $d_6$ denote the axial separation between successive refractive surfaces, respectively, $n_1$ to $n_4$ denote the refractive index with respect to the $d$-line of the glass member from which the respective lenses are made, respectively, and $\nu_1$ to $\nu_4$ denote the Abbe number of the glass members, respectively.

The Seidel's coefficients of aberration for the above embodiments when $f=1.0$ are given in the tables below, where SI, SII, SIII, P and SV denotes the coefficients of spherical aberration, coma, astigmatism, Petzval's sum and distortion, respectively, and the numerals 1 to 7 in the left-most column denote the successive refractive surfaces and Σ denotes the sum of the respective coefficients over all the refractive surfaces. The values given are taken on the assumption that an object being photographed is at infinity and stop is positioned 0.058 rearwardly of the rearmost refractive surface in the objective.

EMBODIMENT I

| | SI | SII | SIII | P | SV |
|---|---|---|---|---|---|
| 1 | 6.8256 | −0.9129 | 0.1221 | 1.3475 | −0.1965 |
| 2 | 0.5332 | −0.9840 | 1.8160 | −0.4692 | −2.4854 |
| 3 | −3.9241 | 3.8328 | −3.7437 | −0.1510 | 3.8041 |
| 4 | −5.8561 | −0.7548 | −0.0973 | −1.4016 | −0.1932 |
| 5 | 0.3856 | 0.3643 | 0.3443 | 0.3507 | 0.6567 |
| 6 | 0.9045 | 0.0822 | 0.0075 | 0.0978 | 0.0096 |
| 7 | 2.3134 | −1.9023 | 1.5642 | 0.4895 | −1.6887 |
| Σ | 1.1821 | −0.2746 | 0.0130 | 0.2637 | −0.0934 |

EMBODIMENT II

| | SI | SII | SIII | P | SV |
|---|---|---|---|---|---|
| 1 | 7.6862 | −1.2365 | 0.1989 | 1.3729 | −0.2529 |
| 2 | 0.8420 | −1.3503 | 2.1654 | −0.4201 | −2.7958 |
| 3 | −4.4102 | 4.2718 | −4.1377 | −0.1455 | 4.1489 |
| 4 | −6.9079 | −0.6982 | −0.0706 | −1.5172 | −0.1605 |
| 5 | 0.4681 | 0.4062 | 0.3523 | 0.3969 | 0.6502 |
| 6 | 1.4191 | 0.0049 | 0 | 0.0916 | 0.0003 |
| 7 | 2.1647 | −1.8563 | 1.5918 | 0.4823 | −1.7786 |
| Σ | 1.2621 | −0.4585 | 0.1003 | 0.2608 | −0.1915 |

EMBODIMENT III

| | SI | SII | SIII | P | SV |
|---|---|---|---|---|---|
| 1 | 8.1345 | −1.0837 | 0.1444 | 1.4286 | −0.2096 |
| 2 | 0.8105 | −1.3087 | 2.1132 | −0.4705 | −2.6526 |
| 3 | −4.9630 | 4.5053 | −4.0898 | −0.1793 | 3.8754 |
| 4 | −7.4857 | −0.8874 | −0.1052 | −1.5435 | −0.1954 |
| 5 | 0.4919 | 0.4323 | 0.3799 | 0.3740 | 0.6626 |
| 6 | 1.5797 | 0.0351 | 0.0008 | 0.0844 | 0.0019 |
| 7 | 2.8529 | −2.1648 | 1.6427 | 0.5702 | −1.6791 |
| Σ | 1.4208 | −0.4719 | 0.0860 | 0.2641 | −0.1939 |

The various aberration curves are indicated in FIGS. 4 to 9. The units on the abscissa are for $f=100$. In FIGS. 4(a) to 6(a), the curves drawn in solid lines show spherical aberration for $d$-line and those in dotted lines for $g$-line. In FIGS. 4(b) to 6(b), the curves drawn in solid lines represent curvature of image field in the sagittal plane and those in dotted lines that in the meridional plane. In FIGS. 7 to 9, the curves drawn in solid lines represent coma for $d$-line and those in dotted lines that for $g$-line, and the abscissa indicate the height of incidence of ray on the final refractive surface in the objective. It will be appreciated that various aberrations are well corrected.

What is claimed is:

1. A photographic objective with a rear stop positioned in the image side space adjacent the final refractive surface, said objective comprising three lens groups, the first lens group being a meniscus converging lens having a convex surface towards an object being photographed, the second lens group being a double concave diverging lens, and the third lens group being a double convex cemented converging lens having its cemented surface directed towards the object, all of the lens groups being mutually spaced by air gaps of an extremely small length, wherein denoting the focal length of the whole system by $f$, axial separation between successive refractive surfaces by $d_1, d_2 \ldots d_6$, respectively, as numbered from the front of the objective facing the object, radius of curvature of the successive refractive surfaces by $r_1, r_2 \ldots r_7$, respectively, and refractive index with respect to the $d$-line of glass members from which successive lenses are made by $n_1, n_2 \ldots n_4$, respectively, the constructional data is defined as follows:

$$0.075f < d_1 < 0.125f$$
$$0.020f < d_2 < 0.045f$$
$$0.020f < d_3 < 0.050f$$
$$0.025f < d_4 < 0.060f$$
$$0.14f < d_2 + d_5 + d_6 < 0.22f$$
$$0.29f < r_1 < 0.35f$$
$$-3.3f < r_3 < -1.8f$$
$$0.26f < r_4 < 0.32f$$
$$0.20f < r_6 < 0.45f$$
$$1.70 < n_1 < 1.85$$
$$1.70 < n_4 < 1.85$$
$$0.04 < n_4 - n_3 < 0.19$$

2. A photographic objective according to claim 1, wherein using the denotations given and denoting the Abbe number of glass members from which successive lenses are made by $\nu_1, \nu_2 \ldots \nu_4$, respectively, the constructional data is given by the table below:

| | | |  |
|---|---|---|---|
| $r_1=0.3208$ | $d_1=0.1$ | $n_1=1.80420$ | $\nu_1=46.6$ |
| $r_2=0.9499$ | $d_2=0.027$ | | |
| $r_3=-2.8539$ | $d_3=0.045$ | $n_2=1.75690$ | $\nu_2=31.7$ |
| $r_4=0.3074$ | $d_4=0.042$ | | |
| $r_5=1.2015$ | $d_5=0.025$ | $n_3=1.72825$ | $\nu_3=28.3$ |
| $r_6=0.3308$ | $d_6=0.1$ | $n_4=1.83060$ | $\nu_4=36.5$ |
| $r_7=-0.9269$ | | | |

3. A photographic objective according to claim 1, wherein using the denotations given and denoting the Abbe number of glass members from which successive lenses are made by $\nu_1, \nu_2 \ldots \nu_4$, respectively, the constructional data is given by the table below:

| | | | |
|---|---|---|---|
| $r_1=0.3174$ | $d_1=0.110$ | $n_1=1.77250$ | $\nu_1=49.6$ |
| $r_2=1.0374$ | $d_2=0.027$ | | |
| $r_3=-2.9605$ | $d_3=0.045$ | $n_2=1.75690$ | $\nu_2=31.7$ |
| $r_4=0.2839$ | $d_4=0.035$ | | |
| $r_5=1.0855$ | $d_5=0.025$ | $n_3=1.75690$ | $\nu_3=31.7$ |
| $r_6=0.2503$ | $d_6=0.135$ | $n_4=1.83060$ | $\nu_4=36.5$ |
| $r_7=-0.9408$ | | | |

4. A photographic objective according to claim 1, wherein using the denotations given and denoting the Abbe number of glass members from which successive lenses are made by $\nu_1, \nu_2 \ldots \nu_4$, respectively, the constructional data is given by the table below:

| | | | |
|---|---|---|---|
| $r_1=0.3120$ | $d_1=0.100$ | $n_1=1.80420$ | $\nu_1=46.6$ |
| $r_2=0.9474$ | $d_2=0.038$ | | |
| $r_3=-2.400$ | $d_3=0.030$ | $n_2=1.75520$ | $\nu_2=27.5$ |
| $r_4=0.2788$ | $d_4=0.040$ | | |
| $r_5=1.1000$ | $d_5=0.025$ | $n_3=1.69895$ | $\nu_3=30.1$ |
| $r_6=0.2300$ | $d_6=0.100$ | $n_4=1.75690$ | $\nu_4=31.7$ |
| $r_7=-0.7555$ | | | |

References Cited

UNITED STATES PATENTS

| 2,720,814 | 10/1955 | Sandback | 350—226 |
| 2,764,063 | 9/1956 | Lange | 350—272 |

FOREIGN PATENTS

| 672,822 | 5/1952 | Great Britain | 350—227 |

JOHN K. CORBIN, Primary Examiner

U.S. Cl. X.R.

350—176, 206